Patented Nov. 7, 1939

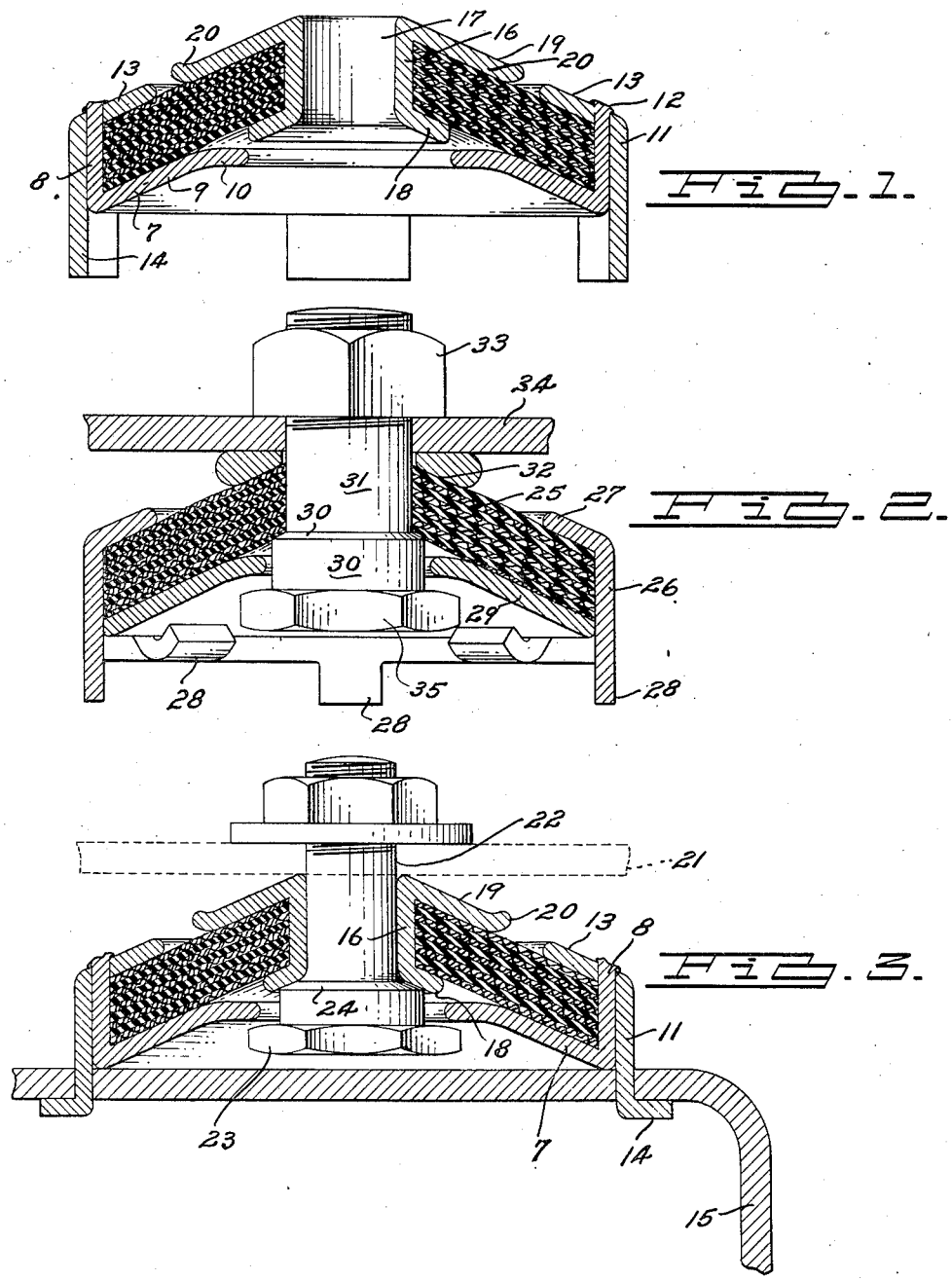

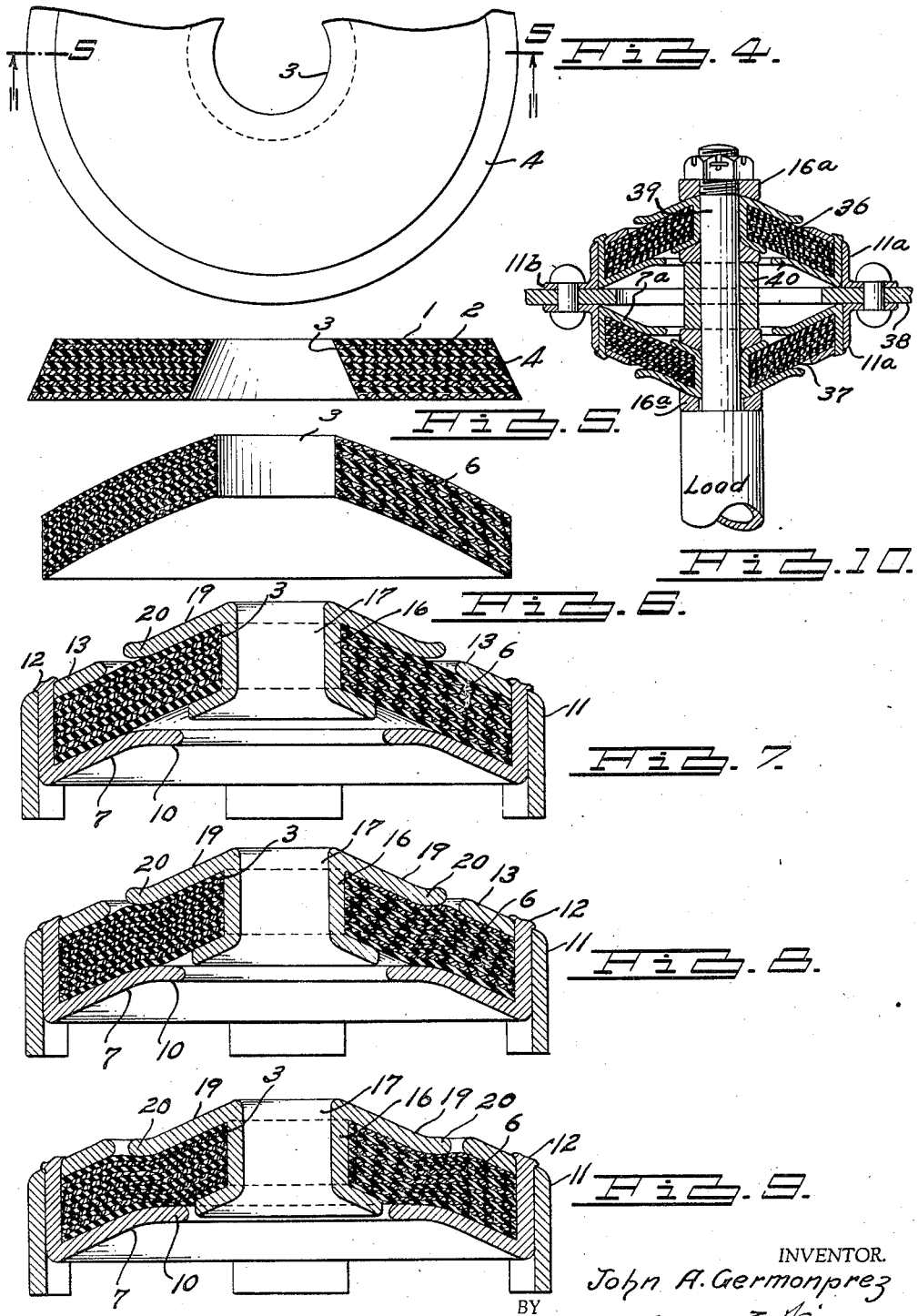

2,179,469

UNITED STATES PATENT OFFICE 2,179,469

VIBRATION ABSORPTION DEVICE

John A. Germonprez, Grosse Pointe Park, Mich., assignor to Fabreeka Products Company, Inc., Boston, Mass.

Application October 23, 1937, Serial No. 170,619

12 Claims. (Cl. 248—358)

This invention relates to vibration absorption devices for use in preventing or reducing the extent of transmission of resonant or harmonic vibrations to an automobile body for instance, and may be utilized between the body and chassis, motor, muffler, spring, radius rods, etc., and in other places wherein machinery, electric motors and equipment are suspended from ceilings or mounted on floors where vibration may be transmitted thereby to the supporting or supported structure.

It has heretofore been the practice to mount the body of an automobile, or an electric motor for instance, upon a resilient pad but the pad is placed under compression by the weight of the supported structure and thus, while functioning to some slight degree, still transmits vibrations to the supported structures as in machinery, motors, etc.

In the case of an automobile, the vibrations of the chassis, due to the wheels traversing a rough road surface, are transmitted to the body to an undesirable degree even though it be mounted on a semi-resilient pad as is the common practice.

The purpose and object of this invention is to provide a vibration absorbing device of such construction and so arranged in respect to the supporting and supported elements that it is capable of absorbing vibrations of various frequencies and thus preventing transmission through to either of the respective elements as the case may be.

More specifically, it is an object of the invention to provide a shock absorber comprising a disk formed of a fabricated compressible and resilient material and holding the same in a coned form by elements connected to the periphery and to the center and mount the periphery of the disk on a supporting element and a load to the center of the disk to thereby apply pressure to the disk tending to flatten the same and further, due to the form of the holding elements at the periphery and center to prevent material distortion of the disk from its coned form and to apply the pressures resultant from the load transversely of the disk substantially throughout an area centrally between the apex and base and thus finally support an excess load on a resilient pad that is held from distortion and thereby resisting and dampening vibration and preventing transmission of the same from the supported or the supporting element to the other.

A further object and feature of the invention is to provide a vibration absorbing device that comprises a flat element of disk-like form and consisting of a series of layers of fabric such as cotton duck or canvass cemented together by thin layers of a soft rubber-like composition that is limitedly compressible and extensible and then changing the shape of the disk from its flat state to the form of a cone by means of casing elements whereby stresses are built up within the disk variable from its apex to the outer periphery and limitedly responsive to vibrations of varying frequency and amplitude and thus counteracted within the disk.

It is further an object and feature of the invention to provide a vibration absorber comprising a coned disk formed of layers of fabric and rubber-like composition preloaded by means of a holder so that certain definite stresses are impressed upon the disk at its center and at its periphery and providing an intermediate portion that is of a flexible and resilient nature and thus responsive to vibrations of various amplitudes and frequency that become absorbed or completely damped within the disk.

A further object and feature of the invention is to provide a vibration absorbing device which comprises two disks of coned form mounted at their bases in opposed relation and preloaded under definite compression strains whereby a load applied to the apex of one of the elements tends to further compress the same and tends to extend the other thus providing in the unitary structure a disk under compression and a disk under tension and tending to dampen vibrations of various amplitudes and frequency, the one under compression tending to damp certain vibrations and the other tending to damp vibrations due to tension applied thereto by the load.

These and other objects and various novel features of the invention are hereinafter more fully described and claimed; and the preferred form of construction of a vibration absorption device embodying my invention is shown in the accompanying drawings in which—

Fig. 1 is a vertical section showing the preferred form of my improved vibration absorber.

Fig. 2 is a similar vertical section of an alternative structure form thereof.

Fig. 3 is a vertical section showing my improved vibration absorber mounted between the chassis and the body frame of an automobile.

Fig. 4 is a plan view of the flexible and resilient disk in its flat form prior to assembly with other parts of the device.

Fig. 5 is a section thereof on line 5—5 of Fig. 4.

Fig. 6 is a similar section showing the disk held in cone-like form by the supporting members shown in Fig. 1.

Figs. 7, 8 and 9 are similar sections diagrammatically illustrating the action of the disk under varying loads.

Fig. 10 is a vertical section of a form of my improved vibration absorber utilizing two disks held in opposed relation wherein one disk is held under compression and the other under tension in a direction substantially parallel with the surface of the respective disk.

Preferably, in constructing my improved vibration absorber, I provide a disk of a flat sheet of material consisting of a series of alternate plies of fabric such as cotton duck and a soft rubber-like composition indicated respectively at 1 and 2 in Fig. 5. A material suitable for the purpose is well known in the market, for instance the fabricated material marketed under the name of "Thermoid", manufactured by Thermoid Rubber Company, Trenton, New Jersey, the material marketed under the name "Fabreeka", manufactured by Fabreeka Products Company, Boston, Massachusetts. This type of material is used at present in its flat form between a support and a load as a cushion which to some extent limits transmission of vibration when under pressure between a load and its support due, in my opinion, to the fact that the fabric plies are relatively movable in their planes to a slight degree. The result of use of such flat sheet between a load and its support is unsatisfactory as the material under such an arrangement will transmit vibrations from the supported to the supporting element or vice versa, depending upon which element initiates the vibratory action. I have discovered that this fault of such character of material may be eliminated practically entirely providing the plies be placed under stress or preloaded as hereinafter described on lines parallel with the plies and thus provide resistant forces within the material itself tending to prevent vibrations being transmitted between the load and the support.

Therefore, a fundamental feature of the invention is involved in the formation of a vibration absorption device consisting of a disk-like element formed of a series of plies of fabric united by a cementitious flexible and resilient material such as soft rubber, latex or other material productive of the desired result and forcing the disk into a coned form with the disk so held and supported at its apex and at its periphery in a manner to maintain the material under compression stresses in a direction substantially parallel with the plane of the plies.

The composition employed for saturating and cementing the fabric and/or employed as an alternate layer therewith should be in such amount as to insure life and flexibility to the pad but without producing the high resiliency and jelly-like action of the usual soft rubber pad and thus thin layers of such cementitious material are desirable and it is desirable that in the manufacture of the device in cementitious material should saturate and unite the plies of the duck and for some purposes may be so utilized without additional interposed layers of soft rubber or the like.

In the construction of a device so characterized, I cut from the sheet of material a disk which, as shown in Fig. 4, has a conical aperture 3 at its center and its periphery 4 also is tapered and the taper of the aperture and the side walls is preferably at an angle of about twenty-five degrees to the vertical as will be understood from Fig. 5. The flat disk is then, as is hereinafter shown, forced to a coned form as shown in Fig. 6 wherein the tapered walls of the aperture and periphery of the disk are forced to occupy a plane parallel with a line from the apex to the center of its base. The stresses set up in changing the flat disk to the coned form have a tendency to force the plies from their normal straight line parallel relation to curved form, particularly in the mid section of the cone as indicated at 6 in Fig. 6, and the diameter of the base of the cone is less than the diameter of the original disk from which it is formed.

For the purpose of supporting the coned disk, I may use a structure such as is shown in Fig. 1 in which the periphery of the disk is supported in a circular metal base 7 having a vertical edge portion 8 against which the periphery of the disk seats and an inwardly extending flange 9 engaging the under side of the disk at its outer edge. The inner edge of the flange 9 is preferably outwardly curved in respect to the disk as shown at 10. The peripheral vertical edge portion 8 of the member 7 has lugs which extend through apertures in a circular element 11 and these lugs are headed over as indicated at 12 to secure the base 7 thereto.

The element 11 has a portion or flange 13 lying over the upper face of the disk for a short distance and further has lugs 14 for fastening the same to a support. These lugs may be introduced through an aperture in the support such as 15 shown in Fig. 3 and outwardly bent as there indicated to fixedly secure the device in place. The disk further has a center ferrule 16 apertured to receive a bolt 17, for instance, and the ferrule 16 has an outturned flange 18 engaging the under surface of the disk and another flange 19 overlying the upper face of the disk. The flange 19 is of greater diameter than the flange 18 and terminates in an upturned portion 20 out of contact with the disk surface at this point. The flange 13 of the element 11 is shorter than the flange portion 9 of the member 7. Likewise, the flange 18 of the ferrule 16 is shorter than the flange 19 of the ferrule 16. This arrangement provides a space between the edge portion 20 of the flange 19 and the edge of the flange 13 of the member 11 and a space between the flange 9 and the flange 18 of the ferrule 16.

The disk, when encased in the manner shown, is under compression strains in a direction parallel with its surfaces which tend to distort the plies from a straight line parallel relation to curved form as hereinbefore stated. Thus, pressures or stresses are built up within the disk which are variable from the apex to the periphery and provide a series of varying forces resistant to relative displacement of the layers of the disk.

In other words, the device, when constructed after the general manner indicated, is preloaded and therefore, before any load is applied to the device, it is in condition for action whether the applied load by the supported element be light or heavy as there is originally sufficient resistance within the disk to absorb the vibrations. As the load is increased, the resistance forces in the disk are increased in proportion to the load and thus the vibrations under heavy load are resisted or absorbed and dissipated as well as under a light load. Vibrations of the support or load do not flow through the disk from its apex to the periphery or vice versa.

I have herein used the term "resistant forces" or "internal resistance" to define the effect produced by placing the disk under compression or under tension as hereinafter described in a direction parallel with its plies under which stress the plies tend to yieldably resist flexure or displacement by influence of applied vibration of various frequencies and amplitude.

When the disk is in cone form under compression strains in a direction parallel with the plies, the said plies in the midsection of the cone, are held under pressure from their normal straight line form and thus yieldably resist change in shape by applied vibration. The plies of alternate fabric and rubber may relatively move due to vibrations and within limits permitted by the elasticity of the rubber layers and due to the layers being held at opposite edges—that is, at the center and at the periphery from longitudinal movement, the whole possible movement is within the center section and decreases each way from the said center section.

Thus vibratory impulses transmitted through one or the other members 16 or 7, is resisted or absorbed in the center section which permits the greatest possible movement between the plies within the unsupported area of the disk and therefore not transmitted to the non-vibrating element. This statement may be incorrrect but is what I believe to be the manner in which the vibrations are absorbed. The fact is, the vibrations are absorbed, whether the cone is under a light of a heavy load and by preloading the disk by compression as hereinbefore pointed out, the device may be used with varying loads with equally as efficient result due to the fact that the load itself determines the resistance force actually developed.

In Fig. 3, I have shown my vibration absorber positioned between the frame 15 of an automobile and a body member 21. In this structure, a headed bolt 22 extends through the body element 21 and the ferrule or hub 16. The lower threaded end of the bolt has a nut 23 formed with a coned face 24 to fit the cone shaped flange 18 of the member 16. The lugs 14 of the outer element 11 at the periphery of the disk are clinched under the chassis frame 15 and with the member 7 resting thereon, there is no possible looseness between the chassis frame and the disk. As the nut 23 is threaded on the bolt 22 the upper edge of the member 16 engages the under side of the body frame. The weight of the body therefore is supported by the disk and tends to flex the plies after the manner indicated by dotted lines in Fig. 3. This is due to compression strains.

The normal and preloaded condition of the device is shown in Fig. 7 wherein it will be noted that the outturned portions 10 of the flange 7 and 20 of the flange 19 are out of contact with the respective lower and upper surfaces of the cone. The preloaded condition is attempted to be illustrated by the curved lines indicating plies of the disk. As the device is loaded—say with a 500 pound load, the outturned flanges of the two elements engage greater surfaces of the disk as shown in Fig. 8 and an increasing load further increases the surface contact of the respective disk surfaces as indicated in Fig. 9. The disk is under compression strains parallel with the plies of the material in its preloaded condition of Fig. 7 but as the load is increased as in Fig. 8 and greater surfaces of the disk are brought to contact with the flanges, there are compression strains set up transversely and practically at a right angle to the normal plane of the disk and this condition is accentuated as is shown in Fig. 9. Under this condition, as is indicated in Figs. 8 and 9, the disk is under compression, both parallel with and transversely of the planes of the plies and under the condition of the added load what may be termed the "relative displacement" or "flow" of the various plies is restricted in the center section of the disk.

The foregoing description has been confined to the structure of the disk shown in Fig. 1. In Fig. 2, there is a different form of structure which is indicative of one of the possible structural forms in which my invention may be embodied.

In Fig. 2, the fabricated material is indicated at 25. The peripheral edge of the cone is supported by the case 26 having an upper flange 27 overlying the upper surface of the disk adjacent its periphery and this case is formed with a series of spaced lugs 28, alternate lugs being intended to be turned upwardly to the under surface of and secure a coned plate 29 in position. The plate 29 extends along the under surface of the disk considerably beyond the point of termination of the flange 27. By turning the alternate lugs 28 upwardly, the remaining lugs project downwardly and may be introduced in slots provided in a supporting element such as a body frame after the manner of the terminal portions 14 of the element 11 shown in Fig. 3.

The plate 29 extends toward the center of the disk and terminates short thereof to permit an enlarged portion 30 of the bolt 31 to pass through the central aperture of the plate 29. The end of the portion 30 of the bolt is tapered to engage the under surface of the disk adjacent the central aperture for the bolt. On the opposite face of the disk from the tapered end of the portion 30 is a washer 32 having a coned face to fit the upper surface of the disk about its apex and is apertured to receive the bolt. A nut 33 is provided for securing the device to a frame member 34 for instance. Thus the disk is positioned between a supported element 34 and a support to which the lugs 28 are to be secured.

The disk is formed from a flat sheet as in the structure shown in Fig. 1 and in forcing the same to coned form, stresses are set up in the plies of the disk 25. It is to be noted that the disk at its apex is clamped between the washer 32 and the tapered shoulder 30' of the bolt. The bolt head 35 is of less distance diametrically across the same than the diameter of the opening at the center of the coned plate 29 and further, the diameter of the washer 32 is greater than the diameter of the central opening of the coned plate 29. The load is applied to the apex of the cone by means of the element 34 and the disk is under compression both transversely of and parallel with the plies. Thus the same character of resistance forces are built up in this structure as in Fig. 1 and also in this structure possible rebound of the load element 34 is limited due to the size of the head 35 of the bolt which, under sufficient movement, would strike the under side of the plate 29.

In the structure shown in Fig. 3 heretofore described, the nut is provided with a similar head to underlie the lower flange 9 and limit possible rebound. The device is Fig. 2 differs more particularly in the general form of the means for supporting the peripheral edge and under surface of the disk and by use of a cap plate 32 in place of the form of ferrule or hub member 16 of Figs. 1 and 3.

A further alternative form of the invention is shown in Fig. 10. The main feature of this latter form resides in the provision of two coned disks in an opposed relation so that a supported load, for instance, placed on the upper apex of the disk 36 or depending from the lower disk places the upper disk practically wholly under compression strains parallel with the plies while the lower disk 37 is placed under tension. The two disks and the peripheral retainer elements and hub or ferrule portions at the center are similar in all general respects to the same holding or casing elements shown in Fig. 1. In the form shown in Fig. 10, the member 11ª of both disks has an outturned flange 11ᵇ and this flange is riveted to a central plate 38 which is centrally apertured and on which the peripheral members 7ª of the disks rest. I provide a bolt 39 which passes through the central hub elements 16ª of bolt disks. In the structure shown, a load may be supported either on the upper end of the device or it may be provided or suspended by the bolt 39 as indicated. In the assembly of the structure of Fig. 10, I provide a spreader sleeve 40 coned at each end to engage the inner flanges of the hub elements 16ª of the two disks. The spreader may be normally even a little greater in length than the distance between the inner flanges 16ª of the two disks. The member 38 may be attached to a base and thus the load is supported by the bolt and transmitted to the disks. Whether the load be at the upper end or the lower end of the bolt, the upper disks 36 will be under compression and the lower disk 37 under tension strains, both conditions of which provide resistant forces within the disk itself tending to damp out vibrations.

The disk under compression functions as hereinbefore described relative to the disk shown in Fig. 1. While the disk 37, due to the movement of the disk 36 by pressure to the apex, is placed under tension, both the disks are held at the periphery from displacement in a vertical plane. Therefore, the compression strains in one disk are approximately equal and opposite to the tension strains in the other. There are thus what may be termed two types of resistance forces in this composite form of my improved vibration absorber.

Each of the forms shown provide a simple and inexpensive structure functioning in a manner superior to the common flat pads of the same structure interposed between the load and support. The pad employed in the formation of a structure embodying my invention may be made by impregnating a plurality of plies of woven cotton duct or like material with a rubber or latex cement or other cementitious material that will not harden sufficiently to become brittle. The fabric plies are usually assembled with interposed thin layers of soft rubber and the whole is then vulcanized together under pressure. The thickness of the rubber or an equivalent material between the layers of duck should only be sufficient to provide a slight movement of one layer of duck in respect to the next layer of duck in a direction parallel with the plane of the fabric. Thus any composition may be utilized between the layers productive of this result and should be of a character to insure long life and flexibility without producing the flexibility of resiliency of the usual soft rubber pad.

The pad may also be formed separated or cut from flat sheets. The pads may also be made of a paper-like disk or layers which have first been impregnated with an abrasive like slag rock and fine pumice and assembled to provide a pad of the desired thickness. In this construction, the abrasive with which the paper is impregnated will add frictional resistance to displacement when the layers are vulcanized together as with a synthetic resin which will harden and so tighten the abrasive particles that the vibration imparted to the disk will add friction tending to restrict the relative displacement of the impregnated sheets.

It is also pointed out that the device may be made of various sizes and thickness of disks, depending more particularly upon the character and type of installation. It may be used as herein shown in vertical position between the body frame and the chassis of an automobile and may be utilized between the motor and the chassis of an automobile or at any point in an automobile where it is required to prevent the vibration of an element being transmitted to the body which results in resonance and noise. The device may also be used in the mounting of motors and other equipment, either in suspending the same from the ceiling or mounting the same upon the floor and many other various places in various kinds of apparatus where vibrations of the device may be transmitted to walls, floors or ceilings.

The invention therefore is not restricted to the particular character of load or support between which it is mounted as by a proper fastening of one of the devices to the apex of the disk and supporting the periphery of the disk upon a foundation of some character or in the use of two disks in opposed relation between such elements. The invention rather resides in the formation of a coned element from an originally flat disk and the placing of such disk under compression or tension strains along lines substantially parallel with the plies. Evidently various changes in the structural relationship of the parts, particularly the elements for holding the disk in its coned form may be made without departing from the spirit and scope of the invention set forth in the appended claims.

Having thus fully described my invention, its utility and mode of operation, what I claim and desire to secure by Letters Patent of the United States is—

1. A vibration absorber comprising a disk formed of a sheet of compressible and resilient material in flat form having a central aperture, a casing means comprising a part enclosing the edge of the disk about the central aperture and contiguous opposite faces of the disk, a portion engaging the periphery of the disk, the two said casing parts holding the disk in the form of a cone under stresses substantially parallel with its surface and tending to flex the disk in the portion thereof intermediate the casing parts, the said central casing part having a portion with a substantially flat face contiguous and extending over the outer surface of the disk to overlie the portion of the peripheral casing part on the under surface of the disk, and means for attaching the respective casing parts to a load and to a support, the two said overlying casing parts, when under load, submitting the disk therebetween to compression on lines extending transversely of the disk.

2. A vibration absorber comprising a disk formed of a flat piece of material consisting of alternate plies of fabric and a flexible rubber-like composition having a central aperture and a circular periphery, a casing means comprising a part enclosing the edge of the disk about the central aperture and a portion enclosing the periphery of the disk and holding the disk in a coned form under stresses substantially parallel with the plies and tending to flex the disk in a portion thereof intermediate the casing parts, the central casing part having a flange-like portion extending over the outer surface of the disk and overlying a similar portion of the peripheral part on the under surface of the cone, and means for attaching the respective casing parts to a load and to a support whereby the disk is placed under additional strains dependent upon the load and maintaining the disk in its central portion between the casing parts under compresion strains transversely of the plies.

3. A vibration absorber comprising a disk formed of a flat piece of material consisting of alternate plies of fabric and a flexible rubber-like composition having a central aperture and a circular periphery, a casing means comprising a part enclosing the edge of the disk about the central aperture and a portion enclosing the periphery of the disk and holding the disk in a coned form under stresses substantially parallel with the plies and tending to flex the disk in a portion thereof intermediate the casing parts, the central casing part having a flange-like portion extending over the outer surface of the disk and overlying a similar portion of the peripheral disk on the under surface of the cone, each of said flange-like portions at its edge extending outwardly from the respective surfaces of the disk on a curved line, and means for attaching the respective casing parts to a load and to a support whereby the disk is placed under additional strains whereby the respective outturned portions of the casing parts are increased in surface contact with the disk surface dependent upon the load and thereby correspondingly reducing the responsiveness of the portion of the disk therebetween to vibrations transmitted thereto by the load or the support as the case may be.

4. A vibration absorber comprising a flat disk formed of alternate plies of fabric-like material and a rubber-like composition and having a central aperture, holding means therefor comprising a member having a central aperture positioned in the central aperture of the disk and having a circumferential channel to receive the edge of the disk about the aperture and a second member of circular form and less diameter than the diameter of the disk in the flat form and further having a channel to receive the periphery of the disk, the two parts maintaining the disk in the form of a cone under pressure in a direction substantially parallel with the plies, with the apex of the cone received in the first mentioned peripherally channeled member, the sides of the channel in said member being substantially parallel to the sides of the cone, means for attaching the peripheral channeled member to a support, and means for attaching a load to the central member, comprising a bolt-like element extending through the aperture thereof and having a shoulder engaging the inner surface of the said channel member and extending therethrough to support the said load attaching means, said bolt-like member at the end within the cone having a head-like portion of a diameter greater than the diameter of the opening at the apex of the outer flange of the peripheral member and spaced therefrom and limiting the extent of movement of the load relative to the support.

5. A vibration absorber comprising a flat disk consisting of a series of plies of fabric-like material and interposed plies of a flexible and resilient rubber-like material, said disk having a central aperture and a circular periphery, means for shaping and holding the disk in a coned form, comprising a member secured to the periphery and having a cone-like portion extending to the interior of the cone shaped material and having a central aperture, a member at the apex of the disk having a coned face engaging the outer face of the disk, the said last named member being of a diameter greater than the diameter of the aperture in said cone-like portion of the peripheral member, the two said holding members placing the disk under stress in a direction substantially parallel with its plies, a bolt-like element extending through the central aperture of the disk and through the holding device at the apex, said bolt-like member having a tapered shoulder fitting the under side of the disk at the apex and clamping the same between the said apex member and shoulder, said bolt further having an enlarged head underlying and spaced from the inner edge of the aperture in the cone-like portion of the means for shaping and holding the disk and limiting the possible upward displacement of the disk at its apex, means for supporting a load on the apex holding means, and means for attaching the periphery of the disk to a support.

6. A vibration absorber comprising a pair of yieldable cone-like elements, means for holding the same in opposed relation and including a separator within and between said elements engaging the inner surfaces of each element adjacent its apex, a grip for a substantial portion of the outer surface of each element adjacent its apex and an abutment for the base of each element holding the base and the inner and outer surface of each element contiguous thereto for a substantial distance away from the base, whereby an axial load puts one element under compression and the other under substantial tension.

7. A vibration absorber comprising in a unitary structure, a pair of disks formed of parallel plies of alternate fabric and rubber-like material and each having a central aperture, means for holding each of the disks in the form of a cone, the disks being in a base to base relation, a supporting means for the said bases of the cones, a separator within the cones and engaging at its opposite ends the respective inner surfaces of the apices, and means for supporting a load to apply the weight thereof to the apex of one of the cones to thereby apply pressure thereto along lines substantially parallel with its plies and tension to the other cone along lines parallel with its plies.

8. A vibration absorber comprising a disk formed of woven fabric plies and thin rubber-like layers substantially parallel to the plane of the disk, said disk being flexed substantially transversely to a general conical shape with the plies substantially parallel to the surface of the cone and without any substantial change in the thickness of the disk, and means for applying a compressive load to the disk in the general direction of its cone surface and plies.

9. A vibration absorber comprising a disk flexed into substantially conical form and provided with a central perforation at its apex, said disk being formed of woven fabric plies in the plane of the disk secured together with a rubber-like adhesive, a bushing in the perforation and provided with radial substantially channel shaped sides which are substantially contiguous the adjacent cone surfaces of the disk, a channel shaped enclosure receiving the peripheral portion of the disk with the sides of the channel contiguous the adjacent surfaces of the cone, the adjacent edges of the inner and outer channel walls being radially spaced, the channel wall extending inwardly from adjacent the base of the cone on the inner side thereof being long enough to radially and substantially overlap the channel wall which extends outwardly from adjacent the apex on the outer surface of the cone, whereby the portion of the cone included between said radially overlapped channel walls is adapted to be loaded in a compression substantially transversely of the plies and the disk locally flexed in opposite directions at radially spaced portions thereof intermediate the apex and base of the cone.

10. A vibration absorber comprising a disk flexed into substantially conical form and provided with a central perforation at its apex, said disk being formed of woven fabric plies in the plane of the disk secured together with a rubberlike adhesive, a bushing in the perforation and provided with radial substantially channel shaped sides which are substantially contiguous the adjacent cone surfaces of the disk, a channel shaped enclosure receiving the peripheral portion of the disk with the sides of the channel contiguous the adjacent surfaces of the cone, the adjacent edges of the inner and outer channel walls being radially spaced, the channel wall extending inwardly from adjacent the base of the cone on the inner side thereof being long enough to radially and substantially overlap the channel wall which extends outwardly from adjacent the apex on the outer surface of the cone, whereby the portion of the cone included between said radially overlapped channel walls is adapted to be loaded in a compression substantially transversely of the plies and the disk locally flexed in opposite directions at radially spaced portions thereof intermediate the apex and base of the cone, the long inwardly extending channel wall on the inner side of the cone having its inner edge portion arranged at an obtuse angle to the main body of said wall.

11. A vibration absorber comprising a conical shaped element of vibration absorbing material provided with an axial and central perforation, said material being laminated substantially parallel to the inner and outer conical surfaces of the element, a channel shaped member engaging the periphery of said element with the side walls of said channel shaped member secured contiguous substantial portions of the inner and outer conical surfaces of said element and the base of said channel shaped member secured to the periphery of said element, and a channel-like means at the apex of said conical element engaging its inner and outer conical surfaces and also engaging said element along the axial walls of its central perforation.

12. A vibration absorber comprising a conical shaped element of vibration absorbing material provided with an axial and central perforation, said material being laminated substantially parallel to the inner and outer conical surfaces of the element, an outer channel shaped member engaging the periphery of said element with the side walls of said channel shaped member secured contiguous substantial portions of the inner and outer conical surfaces of said element and the base of said channel shaped member secured to the periphery of said element, and a central channel-like means at the apex of said conical element engaging its inner and outer conical surfaces and also engaging said element along the axial walls of its central perforation, the central channel-like means having a flange extending along the outer surface of the conical shaped element and the outer channel shaped member having a flange extending along the inner surface of the conical shaped element, said latter flange having a central aperture, the diameter of the first flange being greater than the diameter of the aperture in the other flange.

JOHN A. GERMONPREZ.